Oct. 2, 1956
M. GUREVITCH
2,764,822
CALCULATING APPLIANCE
Filed Oct. 28, 1954
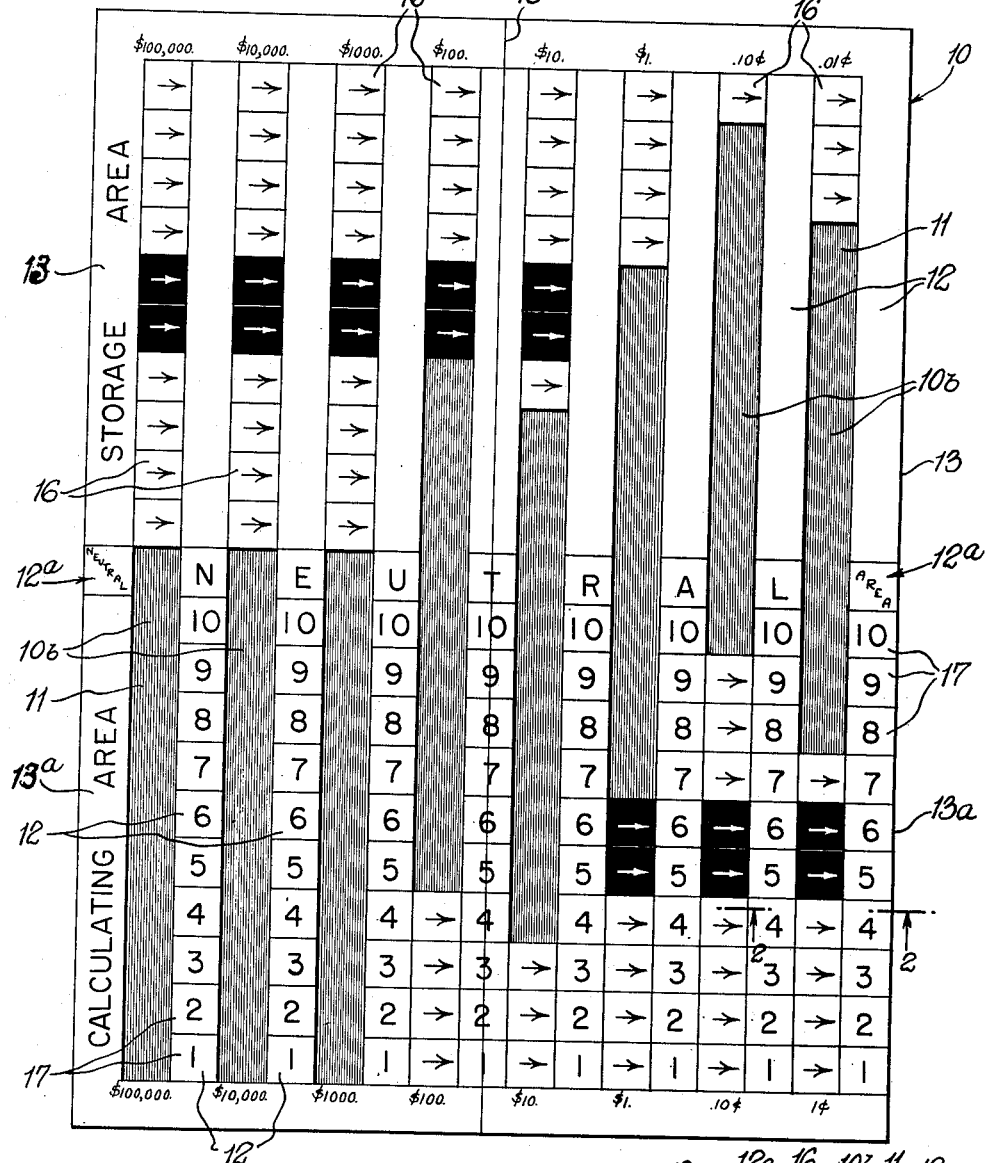
Fig. 1.
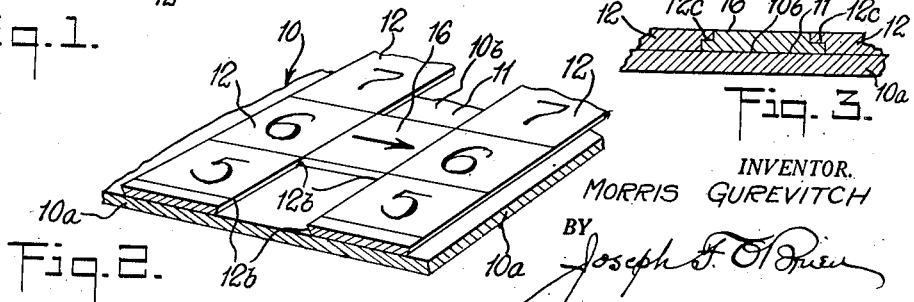
Fig. 2.
Fig. 3.
INVENTOR.
MORRIS GUREVITCH
BY
Joseph F. O'Brien
ATTORNEY United States Patent Office 2,764,822
Patented Oct. 2, 1956

2,764,822

CALCULATING APPLIANCE

Morris Gurevitch, Bronx, N. Y., assignor to Nina Gurevitch, New York, N. Y.

Application October 28, 1954, Serial No. 465,321

1 Claim. (Cl. 35—33)

This invention relates to a calculating appliance and particularly to provide for general use as well as for teaching in schools an improved calculating appliance or apparatus.

One of the objects of this invention is to produce a calculating appliance or apparatus having improved means that will be readily and easily operable in accordance with the decimal system to enable an operator with speed and accuracy to add or subtract and immediately show the answers to problems involving any numbers within the limits of the particular appliance used, and which is preferably from 1 to 1,000,000 and to show or indicate the correct answer.

Another object of my invention is to provide a calculating appliance that will comprise an important improvement over the conventional abacus and which will be so simply and easily operated that any normal person will, with very little practice, be able to operate the device so as to accurately add or subtract to and from each other any numerals within the limits of the appliance, and to show or indicate the correct answer.

Another object of my invention is in an appliance of the character specified to utilize a storage space and also a calculating space having fixed or stationary indications and to provide, in combination with these spaces, a multiplicity of calculating elements that may not only be readily and easily movable or shiftable in the operation of calculating with the appliance but will when shifted by suitably retained in position and will be immediately evaluated by stationary indications.

Another object of my invention is in a calculating appliance of the type specified to provide a series of runways or columns individually identified by stationarily positioned decimal indications and also subdivided and identified separately to indicate units or digits in combination with movable calculating elements arranged in series of ten in a runway or column and adapted to be moved from a storage space of no numeric value to such subdivisions, and thus to attain not only the decimal value of the columnar runway but also to attain a position in a subdivision to indicate a digit or unit value. I thus identify each of said series of columns with fixed decimal indications and also provide for each columnar runway subdivision indications for units or digits opposite to and corresponding to the movable elements that have been moved to such columnar runway, and I also preferably provide on each of the movable elements themselves indications pointing from left to right, and thus immediately by following indications of the elements last moved, indicating the result or answer of an arithmetic operation comprising addition or subtraction that is solved by movement of the movable calculating elements.

Another object of my invention is to produce a calculating appliance of the type specified that may be made from materials that are light in weight and foldable to permit carrying of the appliance in the pocket of the user and that also may be produced at a low cost from many strong materials that are plentiful in commerce.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of a calculating appliance embodying my invention;

Fig. 2 is a section on the line 2—2 of Fig. 1 with the surrounding surface shown in perspective; and Fig. 3 is a similar section of a slightly modified form of my columnar structure.

Referring now to Figs. 1 and 2 of these drawings, which illustrate a preferred embodiment of my invention, 10 indicates an appliance body which, as shown, is preferably thin, flat, of oblong configuration, and preferably comprises, as shown, a backing member 10$^a$ provided on the upper face 10$^b$ thereof with a series of longitudinally-disposed columnar runways 11 produced by a series of fixed partitions 12, two of which are spaced to provide a runway 11. The said face 10$^b$ of the backing member 10$^a$ of the body 10 having said columnar runways 11 is divided substantially in two halves by a transverse line or narrow neutral section 12$^a$ into two main area sections 13, 13$^a$ comprising what I have marked directly on the said face of the appliance body "a storage area" 14 and a calculating area 15. Each of these areas embodies a space having a width sufficient to accommodate or fit eight columnar runways 11, and each of these is designated with decimal indications from 1¢ to $100,000, thus aggregating a limit for the appliance of 1,000,000, when the subdivisions of said columnar runways are taken into consideration as hereinafter specified. Each columnar runway 11 will contain ten units or digits and the calculating section of each runway is subdivided into ten subdivisions or stations corresponding to said ten units or digits. I thus permit the designation of the series of columnar runways with a numeric sequence based on the decimal system and preferably comprising 1¢, 10¢, $1, $10, $100, $1,000, $10,000 and $100,000.

As illustrated, each of the runways 11 is of suitable width to accommodate movable calculating elements 16 and these runways are formed between the adjacent edges 12$^b$ of two adjacent partitions 12. Said partitions comprise flat, elongated strips 12 securely fastened to the backing member 10$^a$. Such strips 12 are long enough and two of them are spaced from each other to provide therebetween a columnar runway 11. Each of such runways has a length at least twice the length of said ten calculating elements so as to permit the longitudinal movement therein of ten movable calculating elements between the top and bottom edges of the appliance or body, and such runways have a width to enable their edges to engage the edges of said calculating elements. Such adjacent edges of the runways are preferably undercut to provide inwardly-projecting beveled edges as shown at 12$^b$ and thus to provide at opposite sides of an element retaining and guiding edges for the said movable calculating elements, each of which is preferably provided with coacting beveled edges having a sliding fit with said edges of the partition strips 12.

Each of said longitudinally-disposed partition strips has the calculating section or area thereof divided into a series of ten fixed calculating subdivisions 17, each of which areas is of a length similar to the length of a calculating element and each of these subdivisions is divided from the others by transverse lines, and I have indicated thereon between such transverse dividing lines forming such subdivisions a numeral starting at the bottom with "1" and terminating with "10" at the top.

Each ten of these subdivisions is adapted to immediately indicate the numeric quantity of calculating elements which have been moved by a user from the storage area to the calculating area adjacent to the said indicating numerals, and in the preferred embodiment of my invention each of the calculating elements is provided with an arrow which when moved into a position alongside of an indicating numeral in the subdivisions or spaces 17 will positively point to such value-indicating numeral. Thus when one or a series of these calculating elements are moved down from the storage area into the calculating area, each of such elements, whether in the 1¢, 10¢, $1, $10, $100, $1,000, $10,000 or $100,000 runway, will be immediately indicated by the station or subdivision and an arrow on the calculating element pointing thereto. Thus, by following the numeral indicated or pointed to by the top arrow in each column, the total number or sum of all the calculating elements that have been moved to the calculating area may be easily seen and found or disclosed.

The appliance body is preferably composed of two sections hinged together at 18 so as to be foldable into a pair of relatively narrow sections adapted to fit into a pocket of the user and when the faces are folded on each other, the movable calculating members 14 will be completely enclosed between the hinged sections.

In Fig. 3 I have shown in section a slightly modified form of the calculating element and the adjacent partitions and have illustrated at 12ᶜ a slightly different form of interengaging connection between such members. It will be understood that any suitable means for interengagement between such calculating elements and the adjacent partitions may be employed without departing from the spirit of my invention.

Having described my invention, I claim:

A calculating appliance embodying an appliance-body composed of a base plate having on its upper surface a frame composed of longitudinal side members and transverse top and bottom members and provided with a depressed flat seat enclosed thereby, a series of flat intermediate longitudinal dividing strips attached to said base plate between said longitudinal side members for providing in said depressed space a series of longitudinal runways and separating said runways from each other, indicating means on the transverse top and bottom frame members for individually identifying said runways with decimal indicia, said series of runways being divided intermediate the ends thereof by a transverse line of indicia into upper and lower sections comprising a storage section of runways and a calculating section of runways, the sections of each runway being unobstructedly connected with each other to permit free movement therebetween, said longitudinal flat dividing strips being provided with indicating means for subdividing each of the runways in said calculating sections into a series of ten calculating stations identified by numerals from 1 to 10 disposed on said flat runway-dividing strips, a series of ten calculating elements comprising flat members fitting said runways and mounted for longitudinal movement therein, said calculating elements being movable individually from said storage section to said calculating section to positions opposite said calculating stations and vice versa, said identifying numerals being arranged at one side of each runway whereby each of such stations may be identified with one of the series of said ten calculating elements, and direction-indicating means on each of the flat calculating elements per se for pointing to an evaluating indication upon movement thereof into an evaluating station in the calculating section and immediate evaluation of movable elements will be provided when said movable elements are moved into such stations in the calculating section.

References Cited in the file of this patent

UNITED STATES PATENTS

| | | |
|---|---|---|
| 232,482 | Fitch | Sept. 21, 1880 |
| 475,162 | Smith | May 17, 1892 |
| 826,732 | Monachimoff | July 24, 1906 |
| 1,183,570 | Kneeshaw | May 16, 1916 |
| 2,190,126 | Sherrill et al. | Feb. 13, 1940 |
| 2,463,763 | Graff | Mar. 8, 1949 |

FOREIGN PATENTS

| | | |
|---|---|---|
| 5,606 | Sweden | July 23, 1894 |
| 234,033 | Germany | Apr. 29, 1911 |
| 587,220 | Great Britain | Apr. 17, 1947 |